US 7,286,806 B2

(12) United States Patent
Kuehnel et al.

(10) Patent No.: US 7,286,806 B2
(45) Date of Patent: *Oct. 23, 2007

(54) DETACHABLE RADIO MODULE

(75) Inventors: Thomas W. Kuehnel, Fremont, CA (US); Anand Valavi, Davis, CA (US); Donald M. Gray, III, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/266,705

(22) Filed: Nov. 3, 2005

(65) Prior Publication Data

US 2006/0068844 A1    Mar. 30, 2006

Related U.S. Application Data

(63) Continuation of application No. 10/092,048, filed on Mar. 5, 2002, now Pat. No. 7,024,224.

(51) Int. Cl.
*H04B 17/00* (2006.01)
*H04B 1/10* (2006.01)
*H04B 1/38* (2006.01)
*H04M 1/00* (2006.01)
*G08B 25/08* (2006.01)

(52) U.S. Cl. .................. 455/226.3; 455/557; 340/692; 375/222; 713/320

(58) Field of Classification Search ................ 455/557, 455/558, 559, 554.1, 226.2, 226.1, 344, 226.3; 713/320; 370/347; 375/220, 222; 340/692
See application file for complete search history.

(56) References Cited

U.S. PATENT DOCUMENTS

| 5,896,574 | A | * | 4/1999 | Bass, Sr. ..................... 455/557 |
| 6,026,119 | A | * | 2/2000 | Funk et al. ................. 375/222 |
| 6,035,183 | A | * | 3/2000 | Todd et al. .............. 455/226.2 |
| 6,127,936 | A | * | 10/2000 | Gendel et al. .............. 340/692 |
| 6,529,743 | B1 | * | 3/2003 | Thompson et al. ......... 455/557 |
| 6,931,554 | B2 | * | 8/2005 | Kung .......................... 713/320 |
| 7,024,224 | B2 | * | 4/2006 | Kuehnel et al. ............ 455/557 |

FOREIGN PATENT DOCUMENTS

EP    1175111 A  *  1/2002

OTHER PUBLICATIONS

D. Keller, Broadband Fixed Wireless Transceiver Serves UNII Band Microwaves & RF, vol. 39, No. 13, Dec. 2000, p. 200.

* cited by examiner

*Primary Examiner*—William D. Cumming
(74) *Attorney, Agent, or Firm*—Workman Nydegger

(57) ABSTRACT

A radio module that detachably connects with a host device. A radio module is provided that includes an antenna as an integral part of the radio module. The antenna satisfies regulatory requirements by being an integral part of the radio module. The radio module includes an interface circuit that provides the processing required for communication over a wireless network. The functionality of the interface can be divided between the radio module and the host device. The physical interface between a host device and the radio module may depend on which functions are implemented by the radio module and which functions are implemented by the host device. In one example, the physical interface is a standard connection that permits the radio module to be detachably connected with multiple devices. The radio module also includes a flexible cable such that the radio module can be optimally positioned within the wireless network.

12 Claims, 2 Drawing Sheets

DETACHABLE RADIO MODULE

RELATED APPLICATIONS

This application is a continuation of U.S. application Ser. No. 10/092,048, filed Mar. 5, 2002 now U.S. Pat. No. 7,024,224, and entitled "Detachable Radio Module." The foregoing patent application is incorporated herein by reference.

BACKGROUND OF THE INVENTION

1. The Field of the Invention

The present invention relates to a detachable radio module. More particularly, the present invention relates to systems, methods, and computer program products for a radio module that may be detachably connected with a client device and that includes an encapsulated antenna for use in a wireless network.

2. Background and Relevant Art

Wireless technologies, which provide several advantages over wired technologies, are becoming increasingly prevalent in computer networks. A prominent advantage of wireless networks is that the requirement of running cables from one computer or device to another computer or device is eliminated. Devices used in wireless networks can be easily relocated as needed without having to worry whether a wired network connection is present for the device being relocated.

Wireless technologies, however, present some problems that are not necessarily present in wired networks. In order to provide increased bandwidth and alleviate interference problems, for example, wireless technologies and networks are migrating to higher frequencies. However, regulations prohibit some wireless networks from utilizing significant transmission power at these higher frequencies. Using higher frequencies can often require the antennas to be adjusted or repositioned in order to insure that the signals are effectively propagated throughout the wireless network.

In addition, regulatory requirements for certain devices, (Unlicensed National Information Infrastructure (UNII) devices, for example), require that these devices use a transmitting antenna that is an integral part of the device or that uses a unique coupling with the device. Currently, the antennas for these devices are not detachable or are fixed to the device, and it is difficult to re-orient the antennas such that the antennas are optimally positioned with respect to the wireless network.

For example, a wireless device such as a computer or a set top box may be part of a wireless network. This device is often positioned inside of a desk or an entertainment center and re-orienting these devices is not only difficult but may also be undesirable from a consumer's viewpoint. Because the antennas are fixed, however, it may be necessary to reposition the device in order to improve the antenna's functionality. This problem is further constrained by the presence of metal in other consumer devices that may be near the wireless device or are stacked on the wireless device. For example, a wireless device such as a set top box may be located with other devices such as cable boxes or digital video recorders. The metal of these devices may have an impact on the ability of the wireless device to send/receive signals in the wireless network.

In other words, regulatory requirements, signal properties of high frequency signals (signal attenuation in transmission cables, for example), and the constraints of positioning a device in, for example, wireless home networks, affect the efficiency and performance of the wireless network.

SUMMARY OF THE INVENTION

These and other limitations of the prior art are overcome by the present invention which relates to a detachable radio module for use with devices in a wireless environment or network. Regulatory requirements for certain devices, such as UNII devices, require an antenna that is an integral part of the device or that has a unique connector with the device in some circumstances. As previously mentioned, an antenna that is an integral part of the device can lead to sub-optimal antenna performance because of the difficulty in properly positioning the device, the interference caused by surrounding metal, or by signal attenuation.

The present invention relates to a radio module that satisfies the regulatory requirements of having an antenna that is an integral part of the device or that has a unique coupling with the device. The radio module is a closed physical entity that includes an antenna. For regulatory purposes, the radio module is the device and the antenna is an integral part of the radio module. The radio module is also provided with one or more other modules that permit the radio module to be detachably connected with another device. The antenna module, for example, includes an interface circuit that permits the device to be connected with a host device using standard or proprietary connectors. Thus, the radio module is detachable connectable with various devices, but the antenna is an integral part of the radio module.

The modules that are integrated with the radio module and included in the interface circuit can vary according to need and network or device configuration. For example, the interface circuit of the radio module may include other modules that perform the processing required for wireless signals. This may include signal demodulation and decoding, media access control, and the like. As a result, the radio module outputs a digital signal that can be received by the host device through a standard connection, such as a USB or 1394 connection, or a proprietary interface. The signal output by the radio module is not subject to attenuation like a higher frequency signal. The operational power required by the radio module can also be supplied through these connections. Alternatively, some of the modules included in the interface circuit may be implemented on the host device, which reduces the complexity of the radio module.

The radio module includes an interface circuit that physically connects the radio module with a host device. The functionality of the interface circuit can vary depending on the functionality implemented by the host device. The physical interface between the radio module and the host device depends on the functionality of the interface circuit and may either be standard or proprietary. In one example, the specific interface of a particular radio module thus depends on the modules and functionality that are included in the particular radio module.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to a radio module that may be connected with a host device using multiple logical and physical interfaces. The radio module is a closed physical entity and an antenna module is an integral part of the radio module. Because the antenna module is an integral part of the radio module, regulatory requirements with respect to the position of the antenna in relationship to the host device are satisfied. The radio module also includes a physical interface that may be connected with a host device. One of the advantages of the present invention is that the physical interface can be a standard interface because the regulatory requirements of the antenna are already satisfied. This permits the radio module to be employed with different host devices and enables the radio module to be more optimally positioned within the wireless network coverage area thereby improving reception and transmission of information through the wireless network.

Figure 1:
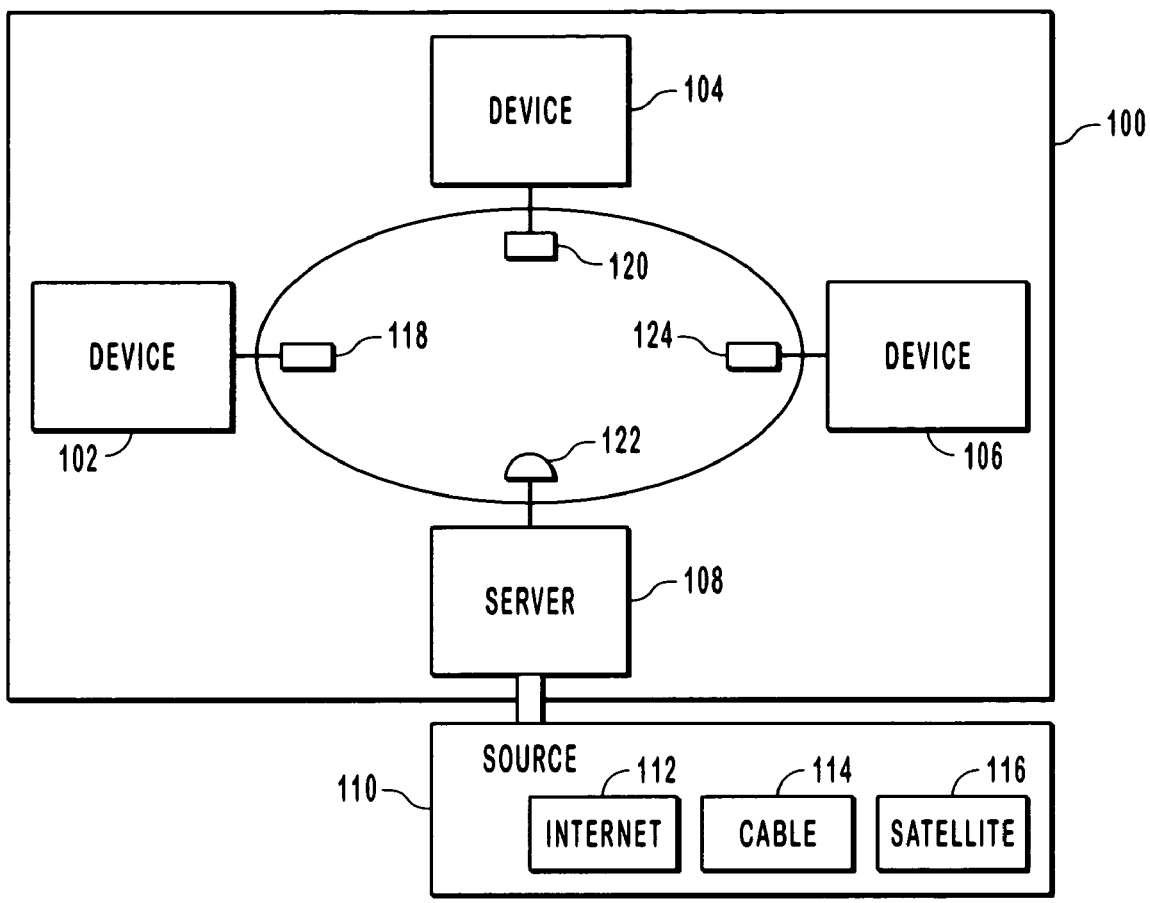
FIG. 1 illustrates an exemplary environment including a wireless network for implementing the present invention.

FIG. 1 illustrates an exemplary environment, including a wireless network, in which the present invention may be implemented and utilized. FIG. 1 illustrates a wireless network 100 of devices that includes, in this example, a server 108, a device 102, a device 104, and a device 106. Often, each device/server is connected with a display device such as a television set or computer monitor and each device and the server are examples of computers or special purpose computers. Exemplary devices include, but are not limited to, computers, servers, cable boxes, satellite receivers, digital video recorders, Internet terminals, set top boxes, and the like or any combination thereof.

In this example, the server 108 often functions as a gateway between the network 100 and a content source 110. Exemplary content sources include, but are not limited to, the Internet 112, a cable system 114, and a satellite system 116. The wireless network 100 is also an example of a local area network that accesses a source such as the Internet through a server computer. The network 100 is an example of a network in which the present invention may be implemented and it is understood that the present invention can be utilized and implemented in other networks as well. In addition, the present invention may also be practiced in wireless networks that include devices that are not wireless enabled.

The content that is exchanged between the server 108 and the content source 110 includes, but is not limited to, video streams (such as an MPEG stream), electronic messages (emails), graphic or photo data, text data, instant messages, television programs, electronic guide data, and the like and any combination thereof. Television and related content (such as guide data) is typically received from either the cable system 114 or the satellite system 116.

In order to receive content from the cable system 114 and/or the satellite system 116, the server 108 (or other receiving device/set top box) is typically required to have a tuner. The tuner is able to tune the incoming source signal such that the content may be processed. For example, the tuner is required in order to view a television program.

In this example, the network 100 is a wireless network. Thus, each device/server communicates with another device/server using the appropriate wireless protocol such as 802.11a, 802.11b, Bluetooth, Hiperlan, and the like. The wireless communication occurring in the network 100 is accomplished using a detachable radio module for the wireless enabled devices in the network. In this example, the device 102 is connected with a radio module 118, the device 104 is connected with a radio module 120, the device 106 is connected with a radio module 124, and the server 108 is connected with a radio module 122. In one specific example, each radio module is a device that is operated in unlicensed spectrum and complies with relevant United States federal regulations such as 47 C.F.R part 15.

Figure 2A:
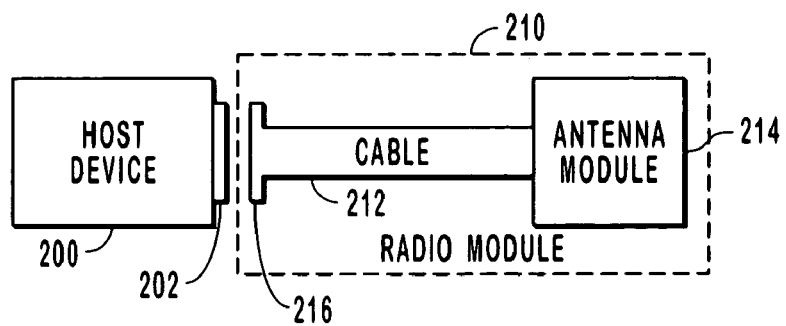
FIG. 2A illustrates an example of a physical layout of a detachable radio module including a cable that detachably connects with a host device.

FIG. 2A is a block diagram that illustrates a radio module that is detachably connected with a set top box. FIG. 2 also focuses on the physical connection between the radio module 210 and the host device 200. The host device 200 includes an interface 202 that detachably connects with an interface 216 of the radio module 210. The interface 202 may be a USB port, a 1394 port, a proprietary port, or the like. The interface 216 is similarly configured and may include a USB connector, a 1394 compliant connector, a proprietary connector, or the like.

The radio module 210 also includes, in this example, a cable 212 and an antenna module 214. The antenna module 214 forms an integral part of the radio module and satisfies applicable regulatory requirements. The cable 212 connects the antenna module 214 with the host device 200 or similar device. The cable 212 is typically not required to carry high frequency signals and is therefore more flexible and pliable. In addition, the cable 212 may have a length ranging from a few centimeters up to a few meters, which is longer than cables carrying high frequency signals. These attributes of the cable 212 and the radio module 210 enable the radio module 210 to be optimally positioned within a wireless network. In other words, a user may simply position or move the radio module 210 instead of the host device 200, which is more difficult to move and reposition, as previously described. Optimally positioning the radio module 210 can be accomplished, for example, by including a user interface with the radio module 210. In one example, the radio module 210 includes a group of LEDs that indicate to a user when the radio module 210 is optimally positioned.

Figure 2B:
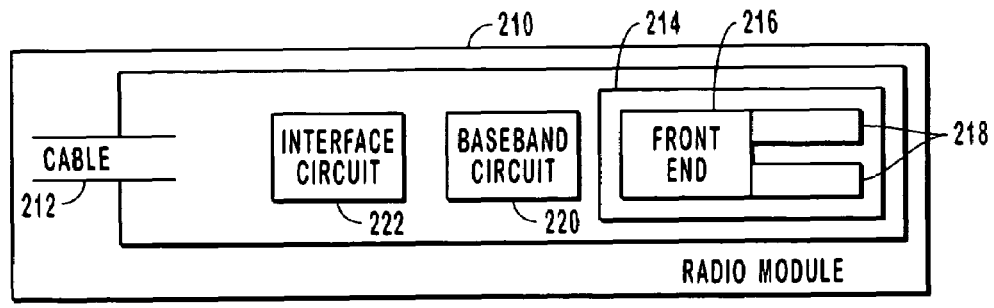
FIG. 2B illustrates a logical interface of the radio module of FIG. 2A.

FIG. 2B illustrates an example of a physical layout of the logical interface of the radio module described in FIG. 2A. The radio module 210 includes a cable 212 as previously described that detachably connects with a host device. The radio module 210 includes an interface circuit 222 that performs processing on the signals that are received and transmitted within the wireless network. The radio module 210 also includes a baseband circuit 220 that performs signal modulation/demodulation, and signal decoding/encoding. The interface circuit 222 often includes a processor (CPU) and memory in order to process the signals that are transmitted/received through the radio module 210. In one example, the baseband circuit 220 is also included in the interface circuit 222.

The radio front end 216 of the antenna module 214 typically includes an oscillator and signal mixer as known in the art, such that the frequency of signal used by the wireless network can be transmitted/received. The antenna module 214 also includes a patch antenna 218. For a received signal, the output of the front end 216 has a lower frequency and is not subject to as much attenuation as the received signal. The baseband circuit 220 performs modulation/demodulation and coding/decoding of the outgoing or received bitstreams, respectively. The interface between the baseband circuit 220 and the front end 216 may be on the order of a few hundred megahertz and 1 gigahertz or more according to the implementation.

In the example of FIG. 2B, the radio module 210 may be viewed as an antenna stripe that has dimensions on the order of 200 millimeters×20 millimeters×5 millimeters. These dimensions are exemplary and the present invention is not constrained by these dimensions.

One advantage of the present invention is that the functional aspects or modules of the radio module may be divided between the radio module and the host device. The logical and physical interfaces are, of course, affected according to the division of functional modules. In one example, the physical interface is implemented using the IEEE 1394 specification. In some situations, however, it may be preferable to perform some of the higher layer protocol processing and/or the baseband processing within the host device. In these cases, the interface may be proprietary. In this example, the modules or functionality of the interface circuit 222 are likewise divided between the radio module 210 and the host device.

Figure 3:
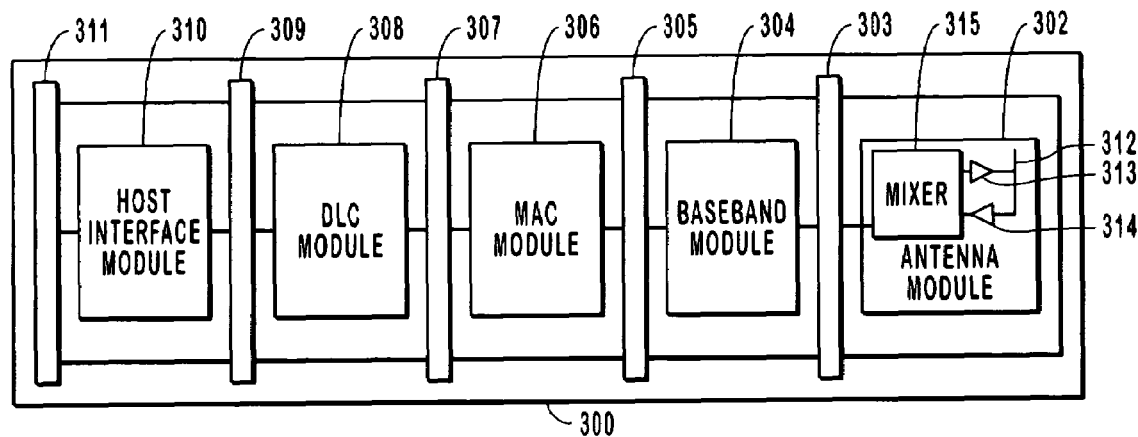
FIG. 3 illustrates the modularity of the radio module and illustrates that an interface can be implemented at various locations of the radio module.

FIG. 3 is a block diagram that illustrates the modular aspects of the radio module and of the interface circuit and indicates that an interface with a host device can be implemented at various stages or locations. FIG. 3 is exemplary in nature and it is understood that the interfaces may be implemented in other locations of the radio module without departing from the scope of the present invention.

FIG. 3 thus illustrates multiple interfaces of a radio module in accordance with the present invention. One advantage of the present invention is that the radio module 300 can be embodied to allocate particular responsibilities to either the radio module 300 or to the host device to which the radio module 300 detachably connects. FIG. 3 thus illustrates interfaces 311, 309, 307, 305, and 303. FIG. 3 also illustrates the radio module 300 as connectable modules. The modules that are implemented in the radio module 300 depend on which interface is chosen. Accordingly, the remaining modules are typically implemented on the host device (shown in FIG. 2). It is understood that the modules described herein are exemplary in nature and do not preclude an interface at another location of the radio module. The interface circuit may thus include one or more of the host interface module 310, the Data Link Control (DLC) module 308, the Media Access Control (MAC) module 306 and the baseband module 304. In other embodiments, additional modules may be included and/or excluded from the interface circuit.

FIG. 3 will be described in terms of the interfaces and the modules on either side of the various interfaces will be addressed as required. The functionality of the modules as described here is known in the art. The interface 311 permits the host interface module 310 to form the logical interface between the radio module 300 and the host device. The host interface module 310 may represent a network or peripheral interface of the host device such as, but not limited to, USB, Ethernet, IEEE 1394, and the like. The protocols for the host interface module are generic. In one example, the host interface module 310 may provide a bridge with limited store and forward capabilities. For example, the isochronous capabilities of IEEE 1394 may be used to provide these capabilities. If the processing power and the latency of the host device permit, data packets as sent to or received from the wireless medium or network can be processed on the fly with no or little buffering. This can be described as synchronous operation. Asynchronous operation may be appropriate in other instances, where buffers are needed to decouple the operation of the host from the time-critical medium access control.

If the interface 309 is chosen for the radio module, the host interface is part of or implemented by the host device and a proprietary connection to the DLC module 308 of the radio module 300 may be required for the radio module. The interface 309 is particularly useful when the host interface 310 cannot be exposed. The DLC module 308 typically implements error control and other functionality that are not related to the medium access mechanism.

If the interface 307 is selected for the radio module 300, then the DLC module 308 is implemented on the host device and the MAC module 306 is included in the radio module 300. As previously stated, the error control and other functionality of the DLC module 308 may not be as timely related to the access mechanism. For that reason and because of buffering in the DLC module and the MAC module, the real time requirements are typically not as stringent which results in higher permissible latencies. The interface 307 is particularly useful when the processing required by the DLC module 308 is performed using the processor of the host device.

If the interface 305 is selected to separate the function performed in the host and the detachable radio module, the MAC module 306, the DLC module 308, and the host interface module 310 are part of or implemented by the host device. A bi-directional bitstream is passed across the interface 305 and the interface 305 may be physically and logically proprietary. To implement the functional split between host system and radio module at the interface 305 requires significant host processor resources to perform time critical MAC functions. The advantages are lower costs of the wireless interface and higher flexibility due to typical software implementations which can be easily modified. Modifications can be useful to incorporate the latest protocol features and/or to provide security updates.

When the interface 303 is selected, the baseband processing performed by the baseband module 304 is performed by or implemented on the host device. The signals passed through the interface 303 are typically analog in nature with frequencies, for example up to a few 100 MHz. When the interface 303 is selected, the physical and logical connections are more susceptible to interference and crosstalk. However, the interface 303 is advantageous when the baseband module 304 is physically separate from the antenna module 302.

The antenna module 302 includes components known in the art for sending and receiving signals in a wireless network. The antenna module 302 includes an antenna 312, an amplifier 313 used for transmission of a radio signal, a RF receiver 314 for receiving a radio signal and an oscillator/mixer 315. The RF receiver 314 may boost the power of the received signal. In one example, the radio signal being received/transmitted by the antenna module 302 is on the order of 5 to 6 GigaHertz. The specific frequency spectrum of the 5 GHz UNII band in the United States is 5150 . . . 5350 MHz.

Figure 4:
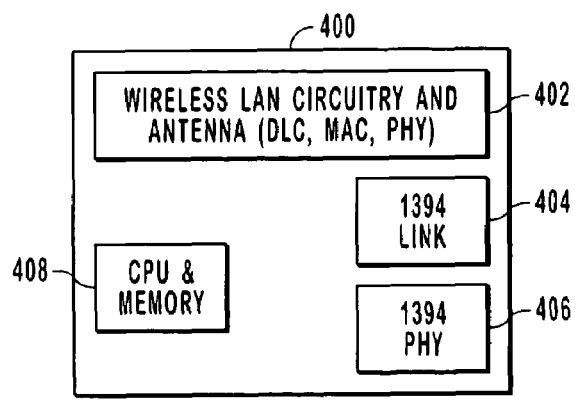
FIG. 4 illustrates an exemplary radio module for a particular protocol and physical interface.

FIG. 4 is a block diagram that illustrates an embodiment of a radio module using IEEE 1394. The radio module 400 includes wireless LAN circuitry (DLC, MAC, PHY) and an antenna (402) that provide the wireless network capabilities. A processor and memory (408) are also included in the radio module 400. The processor enables the radio module 400 to perform processing on the signals being transmitted and received that is not performed by the host device as previously described. The radio module 400 also provides a 1394 physical connection 406 and a 1394 link layer 404.

To simplify the positioning of the radio modules, each radio module may contain an indicator of the received signal strength from the base-station. The indicator can be a single LED, a matrix of multiple LEDs, or a numerical display indicating the current signal strength with respect to the base-station. The signal strength of the base-station is obtained from the received beacon signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A radio module for use with each wireless device in a wireless network such that communication occurs between the wireless devices over the wireless network, wherein the radio module's performance depends on the radio module's position within the wireless network, the radio module comprising:
    an antenna module that includes an antenna and is an integral part of the radio module, the radio module being configured to communicate wirelessly with a remote server via the antenna module;
    an interface circuit for logically connecting the antenna module with a host device, wherein the interface circuit includes a baseband module that demodulates and decodes signals received over the antenna module and that modulates and encodes signals transmitted through the antenna module, a memory, and a processor that processes the signals that are received over the antenna module and transmitted through the antenna module;
    a physical interface for detachably connecting the radio module with the host device, wherein the antenna module, interface circuitry and physical interface comprise an integral unit; and
    a flexible cable between the antenna module and the physical interface, wherein the flexible cable is integral with the antenna module and the physical interface, and wherein the cable permits the radio module to be flexibly positioned within the wireless network without dictating the host device's location.

2. A radio module as defined in claim 1, wherein power to the radio module is supplied through the physical interface.

3. A radio module as defined in claim 1, wherein the interface circuit comprises one or more of:
    a host interface module that forms a logical interface between the host device and the radio module;
    a data link control module that performs at least error control for the host device; or
    a media access control module that manages a bi-directional bitstream between the host device and the antenna module.

4. A radio module as defined in claim 1, further comprising a user interface that indicates to a user when the radio module is optimally positioned within the wireless network, wherein the flexible cable permits the user to re-position the radio module within the wireless network until the user interface indicates that the radio module is optimally positioned.

5. A radio module as defined in claim 1, wherein the processor performs processing required by the interface circuit, wherein processing not performed by the processor occurs on the host device.

6. A radio module that can be flexibly positioned within a wireless network to improve performance of the radio module, the performance of the radio module varying based on position within the wireless network, the radio module comprising:
    an antenna module including an antenna that is an integral part of the radio module, the radio module being configured to communicate wirelessly with a remote server via the antenna module;
    an interface circuit, wherein the interface circuit includes a baseband module, a data link control module, a media access control module, and a physical layer module;
    a processor and memory, wherein the processor provides processing requirements for the interface circuit on the signals that are received and broadcast over the wireless network;
    a protocol link; and
    a physical interface including a flexible cable that detachably connects with a host device such that the radio module may be moved within the wireless network to improve antenna performance without changing the host device's location, and wherein the flexible cable is integral with the interface circuit.

7. A radio module as defined in claim 6, wherein the radio module receives power from a host device.

8. A radio module as defined in claim 6, wherein the protocol link is one of IEEE 1394 or USB.

9. A radio module as defined in claim 6, wherein the physical interface is one of a IEEE 1394 connector or a USB connector.

10. A radio module as defined in claim 6, wherein the cable permits the radio module to be flexibly positioned within the wireless network.

11. A radio module as defined in claim 10, wherein the radio module further comprises a user interface that indicates when the radio module is optimally positioned within the wireless network.

12. A radio module as defined in claim 11, wherein the user interface comprises LEDs.

* * * * *